Patented May 17, 1949

2,470,192

UNITED STATES PATENT OFFICE 2,470,192

RAPID RIPENING OF CELLULOSE ESTERS

George W. Seymour, Maplewood, Blanche B. White, Summit, and Anthony J. Bellucci, East Orange, N. J., assignors to Celanese Corporation of America, a corporation of Delaware No Drawing. Application September 10, 1947, Serial No. 773,288

14 Claims. (Cl. 260—230)

This invention relates to the production of organic acid esters of cellulose, such as cellulose acetate, and relates more particularly to an improved process for the ripening or hydrolysis of organic acid esters of cellulose.

This application is a continuation-in-part of our U. S. application S. No. 633,268 filed on December 6, 1945.

An object of this invention is to provide an improved process for the ripening or hydrolysis of primary organic acid esters of cellulose, such as cellulose acetate, whereby said cellulose esters may be ripened rapidly at elevated temperature and pressure to secondary cellulose esters of the desired acyl value and solubility characteristics without the development of an undesirable degree of color.

Other objects of this invention will appear from the following detailed description.

In the process of preparing organic acid esters of cellulose, such as cellulose acetate, for example, the esterification reaction is usually carried out by treating cellulose with an organic acid anhydride in the presence of a catalyst, such as sulfuric acid or phosphoric acid, and an organic acid diluent or solvent for the cellulose ester being formed. The fully esterified cellulose tri-ester produced is obtained in the form of a viscous, homogeneous solution in the organic acid diluent employed. Water is then added to this primary cellulose ester solution in an amount sufficient to convert any organic acid anhydride remaining to the corresponding acid. The primary cellulose ester, usually after the addition of a further quantity of water, was then permitted to hydrolyze or ripen in solution from the cellulose tri-ester initially formed to a secondary cellulose ester, i. e. one of a lower degree of esterification, having the desired solubility characteristics. During ripening not only are acyl groups hydrolyzed but, in addition, combined sulfuric acid is removed from the cellulose ester. Water and/or other non-solvent for the cellulose ester is then added in amounts sufficient to precipitate the ripened or secondary cellulose ester from solution. The precipitated cellulose ester is washed with water to remove as much acid and other non-cellulose ester materials as possible and is then subjected to a stabilizing treatment with the object of still further reducing its content of combined sulfuric acid. Any combined sulfuric acid imparts to the cellulose ester a tendency to decompose, degrade and/or discolor, particularly when the cellulose ester is exposed to heat as during molding operations. The stability is measured by the degree of acidity developed when a sample of the cellulose ester is treated with distilled water at elevated temperature and pressure for a predetermined period of time. The development of excess acidity denotes a product of unsatisfactory stability.

During the preparation of organic acid esters of cellulose by the above method, the esterification may take from 1½ to 7 hours and the ripening at temperatures of 20 to 35° C., from 20 to 45 or 50 hours, while the stabilizing treatment may take from 3 to 6 hours to achieve the desired stability in the product. Any reduction in the time necessary for reaching the desired acyl value and any improvement in the stability characteristics of said ripened organic acid esters of cellulose which can be effected during the ripening process itself will, obviously, be of great economic value.

As pointed out in the parent application S. No. 633,268, it has been found that the ripening or hydrolysis of organic acid esters of cellulose may be greatly accelerated with the production of ripened cellulose esters of a high order of stability by effecting said ripening under pressure and at a temperature of at least 125° C. This high temperature ripening may be effected, advantageously in a continuous manner by forcing the primary cellulose acetate solution to flow through a closed system, such as a series of pipes, in which it is maintained under pressure and at a ripening temperature of at least 125° C. The rate of flow through the system is so adjusted in relation to the temperature to which it is heated that the cellulose ester solution is retained in the system for a sufficient period of time so that by the time it has passed through the system, the cellulose ester will be ripened or hydrolyzed to the desired acyl value. However, when certain organic acid esters of cellulose are subjected to continuous rapid ripening under these conditions, and, particularly when the same are maintained at a ripening temperature of 150 to 185° C., for example, an undesirable degree of color is found to be rapidly developed in the ripened cellulose esters produced by said continuous ripening operation. Since excessive color in the ripened organic acid esters of cellulose is highly undesirable, and continuous ripening in a closed system is satisfactory only when the system may be operated for long periods and without interruptions or shut-downs, the elimination of said color development is exceedingly important.

We have now found that primary organic acid esters of cellulose, such as cellulose acetate, may be ripened or hydrolyzed under pressure to secondary organic acid esters of cellulose of a high order of stability in a continuous manner at temperatures of at least 125° C. and, more particularly, 150 to 185° C. and the system operated for extended periods of time without the development of an undesirable degree of color in the ripened cellulose esters obtained, if the high temperature rapid ripening is effected in an oxygen-free, inert atmosphere. The oxygen-free, inert atmosphere employed may comprise carbon dioxide, nitrogen or any other suitable inert gas or mixture of gases.

Thus, in the preparation of highly stable ripened or hydrolyzed cellulose acetate by our novel process, cellulose, with or without a pretreatment to render it more reactive, is acetylated with acetic anhydride and an acid catalyst, e. g. sulfuric acid, employing glacial acetic acid as solvent for the cellulose acetate formed. The pretreatment may comprise treating the cellulose with organic acids or organic acids containing some sulfuric acid. Part of the sulfuric acid employed as the catalyst and part of the glacial acetic acid may be introduced in the pretreatment. When acetylation is completed, all or substantially all of the sulfuric acid in the primary solution of cellulose acetate obtained is neutralized by the addition thereto of a sufficient quantity of a suitable neutralizing agent. Water in an amount sufficient to react with all of the anhydride remaining is then added together with additional water for ripening in an amount of 100 to 400% on the weight of the original cellulose employed. The neutralized primary solution of cellulose acetate is then heated and ripening is conducted under pressure in an oxygen-free, inert atmosphere and at a temperature of at least 125° C. Acetone-soluble cellulose acetates of an acetyl value of 53 to 56%, calculated as acetic acid may be obtained by maintaining the primary cellulose acetate undergoing ripening under these conditions of elevated temperature and pressure for less than one hour, a duration of ripening for ¼ to ¾ of an hour usually being sufficient. The maximum temperature at which the ripening may be conducted is limited only by the thermal decomposition temperature of the cellulose acetate in solution. We preferably employ a ripening temperature of 150 to 185° C. for commercial operations so that adequate control of the speed of ripening may be maintained and overripening avoided. The ripened or hydrolyzed cellulose acetate is then precipitated from solution as the same is continuously discharged from the system by the addition of an excess of water thereto. The ripened and precipitated cellulose acetate may then be washed neutral and dried. The cellulose acetates obtained are exceedingly stable. Very little acidity is developed when said cellulose acetates are heated with water at elevated temperature and pressure. While the process of our invention has been more particularly described in connection with continuous ripening operations, the ripening may also be conducted as a batch process employing temperatures of at least 125° C. and an oxygen-free, inert atmosphere.

Any suitable neutralizing agent may be employed, such as, for example, magnesium acetate, zinc acetate, aluminum acetate, calcium acetate, strontium acetate, barium acetate, strontium oxide, barium oxide, strontium hydroxide, barium hydroxide, and magnesium carbonate. We prefer to avoid the use of neutralizing agents which form sodium salts, since the presence of sodium salts during ripening is undesirable as said sodium salts, even in relatively small quantities, tend to inhibit splitting off of sulphate during ripening. In larger concentrations, the presence of sodium salts may even prevent the splitting off of said sulfate.

The use of magnesium carbonate as the neutralizing agent is preferred, however, since the reaction of said carbonate with the free sulfuric acid catalyst remaining when esterification is completed forms free carbon dioxide which acts to displace any air dissolved in the reaction solution and to blanket the reaction mixture with carbon dioxide thus forming the desired oxygen-free, inert atmosphere. The primary solution of cellulose acetate may then be delivered to the ripening system or to a ripening zone, where the ripening is effected, by employing carbon dioxide, nitrogen, or other inert gas under pressure to effect the transfer. The heated solution of the primary cellulose acetate is retained, as stated, in the ripening system or zone for a sufficient period of time at the particular high temperature employed to effect the desired degree of hydrolysis.

The amount of sulfuric acid in the neutralized primary solution of cellulose acetate during ripening or hydrolysis, where some free acid is allowed to remain, is preferably no greater than about 0.1 to 0.15% by weight of the primary solution. The sulfuric acid present may be reduced to this amount by neutralizing substantially all of the sulfuric acid catalyst remaining by the addition to the primary solution of a suitable quantity of any of the neutralizing agents mentioned above. A slight excess of neutralizing agent may also be added to the primary solution of cellulose acetate so that all of the sulfuric acid is neutralized and an excess of neutralizing agent will be present in the primary solution during ripening or hydrolysis. Where an excess of neutralizing agent is employed, such as, for example, an excess of magnesium carbonate, the most advantageous results are obtained where the primary solution undergoing ripening contains an excess of the latter of up to about 0.2% by weight, calculated as magnesium oxide. Whether all or substantially all of the sulfuric acid is neutralized by the addition of a sufficient quantity of neutralizing agent, ripening at elevated temperature and pressure in an inert oxygen-free atmosphere, in accordance with our novel process, yields highly stable cellulose acetates of any desired acetyl value in an exceedingly short period of time and without the development of an undesirable degree of color.

We prefer, however, to conduct the ripening in the presence of excess alkaline neutralizing agent, since cellulose esters of a higher degree of polymerization are obtained under such conditions. The loss of molecular weight is less rapid where excess alkaline neutralizing agent is present during ripening than under those conditions where ripening is conducted in the presence of some free sulfuric acid.

When ripening under pressure at high temperatures, in accordance with our novel process, it is most desirable that ripening be carried out with as large a quantity of water as possible present in the primary solution without, however, causing any precipitation of the cellulose acetate before the latter has been ripened to the desired acetyl value. Usually, large quantities of water, e. g. 100 to 400% on the weight of the cellulose esterified, cannot be added to the primary solution when the latter contains a rather high proportion of combined sulfates without causing some precipitation. The water addition may, therefore, be made in two states if high combined sulfates are present. An initial water addition, e. g. 25 to 50% on the weight of the cellulose esterified may be added and the primary cellulose acetate in solution hydrolyzed for a short time at an elevated temperature of 130 to 150° C. until the combined sulfates are split off. This prehydrolysis may also be advantageously conducted in an inert, oxygen-free gaseous medium. Higher temperatures with little water present favor the splitting off of the combined sulfates. After the combined sulfates have been removed a much larger quantity of water may then be added, e. g. 100 to 400% on the weight of the cellulose, and the rapid ripening of the cellulose acetate to the desired acetyl value then effected in an inert, oxygen-free atmosphere under conditions of elevated temperature and pressure.

The advantages of a high temperature with little water present, which conditions, as indicated above, favor the splitting off of the sulfates, may be obtained by heating the primary cellulose acetate solution to the desired temperature by the direct injection of steam therein. Under the localized conditions created by this method of heating, only relatively small quantities of water are added through the medium of the condensed steam and the combined sulfates present are caused to split off almost instantaneously. A large water addition can then be made either directly or through the medium of condensing steam without causing any precipitation of the cellulose acetate and the ripening of the primary cellulose acetate in solution continued at a high temperature and under pressure until the desired acetyl value is reached. Since ripening may be completed in a very short time following acetylation, the time cycle enables a highly efficient continuous ripening process to be employed.

In order further to illustrate our invention, but without being limited thereto, the following examples are given:

Example I 162 parts by weight of an equal mixture of cotton linters and wood pulp cellulose are pretreated with a mixture of 0.85 part by weight of sulfuric acid, 0.85 part by weight of water and 60 parts by weight of glacial acetic acid. The mixture is tumbled for a short time to ensure a uniform distribution of the liquid and is then allowed to stand for 2 hours at a temperature of 25° C. to complete the activation of the cellulose. After this pretreatment, the cellulose is entered into an acetylizer containing 410 parts by weight of acetic anhydride, 560 parts by weight of acetic acid and 22.5 parts by weight of sulfuric acid. The acetylation reaction is allowed to continue for 1½ hours with a peak temperature of 35 to 45° C. being reached. At the completion of esterification, the sulfuric acid in the primary solution of cellulose acetate is completely neutralized by the addition of excess magnesium carbonate thereto, a solution which contains about 0.2% by weight excess magnesium carbonate, calculated as magnesium oxide, being obtained. The stream of carbon dioxide generated by the reaction of the magnesium carbonate and sulfuric acid acts to sweep all of the air from the reaction vessel. Water is added to react with all of the acetic anhydride remaining and an additional quantity of water in an amount equal to 175% on the weight of the original cellulose is then added for ripening. This water addition is made in one stage without any prehydrolysis. The primary solution of cellulose acetate is then transferred to a suitable pump by means of nitrogen under pressure, while excluding all air, and is then forced into a manifold communicating with a series of pipes of relatively small diameter wherein the solution is heated to an average temperature of 172° C. for ripening. The rate at which the solution is pumped through the pipes is adjusted so that any given portion is retained therein for 25 minutes, during which time the cellulose acetate in solution is ripened to an acetyl value of about 54.6%, calculated as acetic acid. The system is run continuously for 145 hours and the ripened cellulose acetate continuously precipitated. At the start of the continuous ripening the total color of the ripened cellulose acetate obtained is 8.0 and the clarity is 75, said color and clarity being determined on a 6% by weight solution of the ripened, precipitated and dried cellulose acetate dissolved in 95/5 acetone/water. After 145 hours the total color of the ripened cellulose acetate is found to be 10.4 and the clarity 73. Total color is determined by means of a standard tintometer. When primary cellulose acetate is ripened under the same conditions to an average acetyl value of 54.5%, calculated as acetic acid, with no precautions being taken to exclude oxygen the total color of the cellulose acetate obtained at the start of ripening is about 8.1 and the clarity is 53. After 25 hours, during which ripening is effected continuously, the ripened cellulose acetate obtained exhibits a total color of 55 and a clarity of 61.

The tintometer employed consists of a lightproof housing painted black inside and divided into 2 compartments. Colored light from the object to be measured, in this case the solution contained in a standard glass tube, is transmitted through one compartment and light from a standard white background through the other. The white light is interrupted through combinations of standard color glasses until it corresponds in color with the object to be measured and the numerical color value of the glasses used is noted.

The clarity is determined by gradually filling a tube of standard diameter with a 3% by weight solution of cellulose acetate in a solvent consisting of 95% by weight of acetone and 5% by weight of water until a spot at the base of the tube is just obscured, the clarity being given as the height of the liquid in the tube in centimeters when said spot is just obscured.

Example II

A neutralized primary solution of cellulose acetate containing water for ripening and obtained in the manner described in Example I is heated to a temperature of 154° C. and continuously ripened under pressure in an oxygen-free, inert atmosphere, to an acetyl value of about 54%, calculated as acetic acid. The total color of the ripened cellulose acetate initially produced is 6.3 and the clarity is 85. After continuous ripening is conducted in the system for 104 hours, the ripened cellulose acetate obtained has a total color of 8.8 and a clarity of 80. When ripening of the primary cellulose acetate solution is continuously effected under the same conditions, without excluding oxygen, however, the total color of the cellulose acetate after the system has been in operation for only 28 hours is 54.5 and the clarity is 44.

While our invention has been more particularly described in connection with the production of highly stable, ripened cellulose acetate, it will be understood, of course, that our improved rapid ripening process employing elevated temperatures and pressure and an oxygen-free, inert atmosphere may also be employed in the production of other highly stable ripened or hydrolyzed organic acid esters of cellulose. Examples of other organic acid esters of cellulose which may be prepared by our novel process are cellulose propionate and cellulose butyrate, as well as mixed esters, such as cellulose acetate-propionate, cellulose acetate-butyrate and cellulose acetate-crotonate.

Where the terms "ripening in a continuous manner" and "continuously ripening" are employed in the foregoing specification and in the appended claims, it is to be understood that said terms refer to the ripening of a primary solution of a cellulose ester to a secondary cellulose ester employing a closed system wherein the primary cellulose ester solution is continuously forced into one end of said closed system wherein it is maintained at an elevated ripening temperature and a ripened or secondary cellulose ester is continuously discharged from the other end of said system, the moving solution being retained in said system for a sufficient period of time at the particular temperature employed to achieve the desired degree of ripening.

It is to be understood that the foregoing detailed description is given merely by way of illustration and that many variations may be made therein without departing from the spirit of our invention.

Having described our invention, what we desire to secure by Letters Patent is:

1. In a process for the production of highly stable, ripened organic acid esters of cellulose wherein cellulose is esterified with a lower aliphatic acid anhydride, employing an inorganic acid as catalyst and an aliphatic acid as a solvent, the acid catalyst in the primary cellulose ester solution obtained on completion of esterification is neutralized by adding a neutralizing agent thereto, and the cellulose ester in the primary solution is ripened to a secondary cellulose ester of the desired acyl value, the step of effecting said ripening under pressure and at a temperature of at least 125° C. in an oxygen-free, inert atmosphere.

2. In a process for the production of highly stable, ripened organic acid esters of cellulose wherein cellulose is esterified with a lower aliphatic acid anhydride, employing an inorganic acid as catalyst and an aliphatic acid as a solvent, the acid catalyst in the primary cellulose ester solution obtained on completion of esterification is neutralized by adding a neutralizing agent thereto, and the cellulose ester in the primary solution is ripened to a secondary cellulose ester of the desired acyl value, the step of effecting said ripening in a continuous manner under pressure and at a temperature of at least 125° C. in an oxygen-free, inert atmosphere.

3. In a process for the production of highly stable, ripened organic acid esters of cellulose wherein cellulose is esterified with a lower aliphatic acid anhydride employing an inorganic acid as catalyst and an aliphatic acid as a solvent, the acid catalyst in the primary cellulose ester solution obtained on completion of esterification is neutralized by adding a neutralizing agent thereto, and the cellulose ester in the primary solution is ripened to a secondary cellulose ester of the desired acyl value, the step of effecting said ripening under pressure and at a temperature of 150° to 185° C. in an oxygen-free, inert atmosphere.

4. In a process for the production of highly stable, ripened organic acid esters of cellulose wherein cellulose is esterified with a lower aliphatic acid anhydride employing an inorganic acid as catalyst and an aliphatic acid as a solvent, the acid catalyst in the primary cellulose ester solution obtained on completion of esterification is neutralized by adding a neutralizing agent thereto, and the cellulose ester in the primary solution is ripened to a secondary cellulose ester of the desired acyl value, the step of effecting said ripening in a continuous manner under pressure and at a temperature of 150° to 185° C. in an oxygen-free inert atmosphere.

5. In a process for the production of highly stable, ripened organic acid esters of cellulose wherein cellulose is esterified with a lower aliphatic acid anhydride employing an inorganic acid as catalyst and an aliphatic acid as solvent, the acid catalyst in the primary cellulose ester solution obtained on completion of esterification is neutralized by adding an excess of neutralizing agent thereto, and the cellulose ester in the primary solution is ripened to a secondary cellulose ester of the desired acyl value, the step of effecting said ripening under pressure and at a temperature of at least 125° C. in an oxygen-free, inert atmosphere.

6. In a process for the production of highly stable, ripened organic acid esters of cellulose wherein cellulose is esterified with a lower aliphatic acid anhydride employing an inorganic acid as catalyst and an aliphatic acid as a solvent, the acid catalyst in the primary cellulose ester solution obtained on completion of esterification is neutralized by adding an excess of neutralizing agent thereto, and the cellulose ester in the primary solution is ripened to a secondary cellulose ester of the desired acyl value, the step of effecting said ripening under pressure and at a temperature of 150 to 185° C. in an oxygen-free, inert atmosphere.

7. In a process for the production of highly stable, ripened cellulose acetates wherein cellulose is esterified with acetic anhydride employing an inorganic acid as catalyst and acetic acid as a solvent, the acid catalyst in the primary cellulose acetate solution is neutralized by adding a neutralizing agent thereto, and the cellulose acetate in the primary solution is ripened to a secondary cellulose acetate of the desired acetyl value, the step of effecting said ripening under pressure and at a temperature of at least 125° C. in an oxygen-free, inert atmosphere.

8. In a process for the production of highly stable, ripened cellulose acetates wherein cellulose is esterified with acetic anhydride employing an inorganic acid as catalyst and acetic acid as a solvent, the acid catalyst in the primary cellulose acetate solution is neutralized by adding a neutralizing agent thereto, and the cellulose acetate in the primary solution is ripened to a secondary cellulose acetate of the desired acetyl value, the step of effecting said ripening in a continuous manner under pressure and at a temperature of at least 125° C. in an oxygen-free, inert atmosphere.

9. In a process for the production of highly stable, ripened cellulose acetates wherein cellulose is esterified with acetic anhydride employing an inorganic acid as catalyst and acetic acid as a solvent, the acid catalyst in the primary cellulose acetate solution is neutralized by adding a neutralizing agent thereto, and the cellulose acetate in the primary solution is ripened to a secondary cellulose acetate of the desired acetyl value, the step of effecting said ripening under pressure and at a temperature of 150 to 185° C. in an oxygen-free, inert atmosphere.

10. In a process for the production of highly stable, ripened cellulose acetates wherein cellulose is esterified with acetic anhydride employing an inorganic acid as catalyst and acetic acid as a solvent, the acid catalyst in the primary cellulose acetate solution is neutralized by adding an excess of neutralizing agent thereto, and the cellulose acetate in the primary solution is ripened to a secondary cellulose acetate of the desired acetyl value, the step of effecting said ripening under pressure and at a temperature of at least 125° C. in an oxygen-free, inert atmosphere.

11. In a process for the production of highly stable, ripened cellulose acetates wherein cellulose is esterified with acetic anhydride employing an inorganic acid as catalyst and acetic acid as a solvent, the acid catalyst in the primary cellulose acetate solution is neutralized by adding an excess of neutralizing agent thereto, and the cellulose acetate in the primary solution is ripened to a secondary cellulose acetate of the desired acetyl value, the step of effecting said ripening under pressure and at a temperature of 150 to 185° C. in an oxygen-free, inert atmosphere.

12. In a process for the production of highly stable, ripened cellulose acetates wherein cellulose is esterified with acetic anhydride employing an inorganic acid as catalyst and acetic acid as a solvent, the acid catalyst in the primary cellulose acetate solution is neutralized by adding an excess of neutralizing agent thereto, and the cellulose acetate in the primary solution is ripened to a secondary cellulose acetate of the desired acetyl value, the step of effecting said ripening in a continuous manner under pressure and at a temperature of 150 to 185° C. in an oxygen-free, inert atmosphere.

13. In a process for the production of highly stable, ripened cellulose acetates wherein cellulose is esterified with acetic anhydride employing sulfuric acid as catalyst and acetic acid as a solvent, the acid catalyst in the primary cellulose acetate solution is neutralized by adding an excess of magnesium carbonate thereto, and the cellulose acetate in the primary solution is ripened to a secondary cellulose acetate of the desired acetyl value, the step of effecting said ripening under pressure and at a temperature of 150 to 185° C. in an oxygen-free, inert atmosphere comprising carbon dioxide.

14. In a process for the production of highly stable, ripened cellulose acetates wherein cellulose is esterified with acetic anhydride employing sulfuric acid as catalyst and acetic acid as a solvent, the acid catalyst in the primary cellulose acetate solution is neutralized by adding an excess of magnesium carbonate thereto, and the cellulose acetate in the primary solution is ripened to a secondary cellulose acetate of the desired acetyl value, the step of effecting said ripening under pressure and at a temperature of 150 to 185° C. in an oxygen-free, inert atmosphere comprising carbon dioxide and nitrogen.

GEORGE W. SEYMOUR.
BLANCHE B. WHITE.
ANTHONY J. BELLUCCI.

REFERENCES CITED

The following references are of record in the file of this patent:

UNITED STATES PATENTS

| Number | Name | Date |
|---|---|---|
| 2,329,704 | Dreyfus et al. | Sept. 21, 1943 |